(12) United States Patent
Dixon et al.

(10) Patent No.: US 9,384,120 B2
(45) Date of Patent: *Jul. 5, 2016

(54) TESTING OF TRANSACTION TRACKING SOFTWARE

(71) Applicant: International Business Machines Corporation, Armonk, NY (US)

(72) Inventors: Scot Dixon, South Perth (AU); Steven Larcombe, Victoria Park (AU); Gregory R. Fallon, Leeming (AU); Nicholas Wu, Dianella (AU); Cao Phuong, Landsdale (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,476

(22) Filed: Sep. 8, 2014

(65) Prior Publication Data

US 2015/0186252 A1    Jul. 2, 2015

Related U.S. Application Data

(63) Continuation of application No. 14/144,821, filed on Dec. 31, 2013.

(51) Int. Cl.
*G06F 9/44* (2006.01)
*G06F 11/36* (2006.01)

(52) U.S. Cl.
CPC .............. *G06F 11/3684* (2013.01); *G06F 8/70* (2013.01); *G06F 11/3688* (2013.01)

(58) Field of Classification Search
CPC ......................................................... G06F 9/44
USPC ................... 717/127, 128, 131, 133
See application file for complete search history.

(56) References Cited

U.S. PATENT DOCUMENTS

| 6,714,976 | B1 * | 3/2004 | Wilson et al. ................. 709/224 |
| 7,398,469 | B2 * | 7/2008 | Kisamore et al. ............. 715/704 |
| 7,454,659 | B1 * | 11/2008 | Gaudette et al. ................ 714/33 |
| 8,464,219 | B1 * | 6/2013 | Wilkerson ........... G06F 11/3664 717/120 |
| 2002/0063735 | A1 * | 5/2002 | Tamir ................... G06F 11/3438 715/745 |
| 2004/0024610 | A1 * | 2/2004 | Fradkov ................ G06Q 20/04 719/328 |
| 2008/0196016 | A1 * | 8/2008 | Todd ............................. 717/143 |
| 2009/0249279 | A1 * | 10/2009 | Bourdon ....................... 717/101 |

(Continued)

OTHER PUBLICATIONS

U.S. Appl. No. 14/144,821, filed Dec. 31, 2013; Entitled "Testing of Transaction Tracking Software".

*Primary Examiner* — Chat Do
*Assistant Examiner* — Jae Jeon
(74) *Attorney, Agent, or Firm* — Edward J. Wixted, III

(57) ABSTRACT

In a method for generating test transactions across computing systems, a first test function of a first program on a first computing system of a plurality of computing systems receives a plurality of instructions, wherein a first instruction of the plurality of instructions is to invoke a first transaction between a second function of the first program and a second program on a second computing system of the plurality of computing systems. The first test function of the first program causes the transaction between the second function of the first program on the first computing system and the second program on the second computing system. The first test function of the first program sends the plurality of instructions to a second test function on a third computing system of the plurality of computing systems, based on a second instruction of the plurality of instructions.

5 Claims, 5 Drawing Sheets

(56) References Cited

U.S. PATENT DOCUMENTS

| | | |
|---|---|---|
| 2010/0095159 A1 | 4/2010 | Jeong et al. |
| 2010/0180284 A1* | 7/2010 | Ross .......................... 719/330 |
| 2011/0161350 A1* | 6/2011 | Wang .................. H04L 67/12 707/769 |
| 2011/0208709 A1* | 8/2011 | Holthausen ....... G06F 17/30864 707/706 |
| 2013/0042230 A1* | 2/2013 | Little et al. .................... 717/173 |
| 2013/0227547 A1* | 8/2013 | Little ............................. 717/177 |
| 2014/0380274 A1* | 12/2014 | Driesen et al. ................ 717/120 |

\* cited by examiner

TESTING OF TRANSACTION TRACKING SOFTWARE

FIELD OF THE INVENTION

The present invention relates generally to the field of software testing, and more particularly to the generation of data to test transaction tracking software across diverse topologies.

BACKGROUND OF THE INVENTION

Transaction tracking software is software used to track transactions across multiple technologies, protocols, domains, and operating systems. Tracking may be achieved by monitoring tracking events at strategic points in application flow.

Testing transaction tracking software typically involves developing a large repository of test applications and/or scripts that drive individual transactions within a targeted environment. An external client may be used to drive transaction loads into middleware and other applications to generate test scenarios. Test scenarios may include the invocation of local services and the generation of transactions within the system or across multiple systems.

SUMMARY

Aspects of an embodiment of the present invention disclose a method, computer program product, and computing system for generating test transactions across computing systems. A first test function of a first program on a first computing system of a plurality of computing systems receives a plurality of instructions, wherein a first instruction of the plurality of instructions is to invoke a first transaction between a second function of the first program and a second program on a second computing system of the plurality of computing systems. The first test function of the first program causes the transaction between the second function of the first program on the first computing system and the second program on the second computing system. The first test function of the first program sends the plurality of instructions to a second test function on a third computing system of the plurality of computing systems, based on a second instruction of the plurality of instructions.

DETAILED DESCRIPTION

Figure 1:
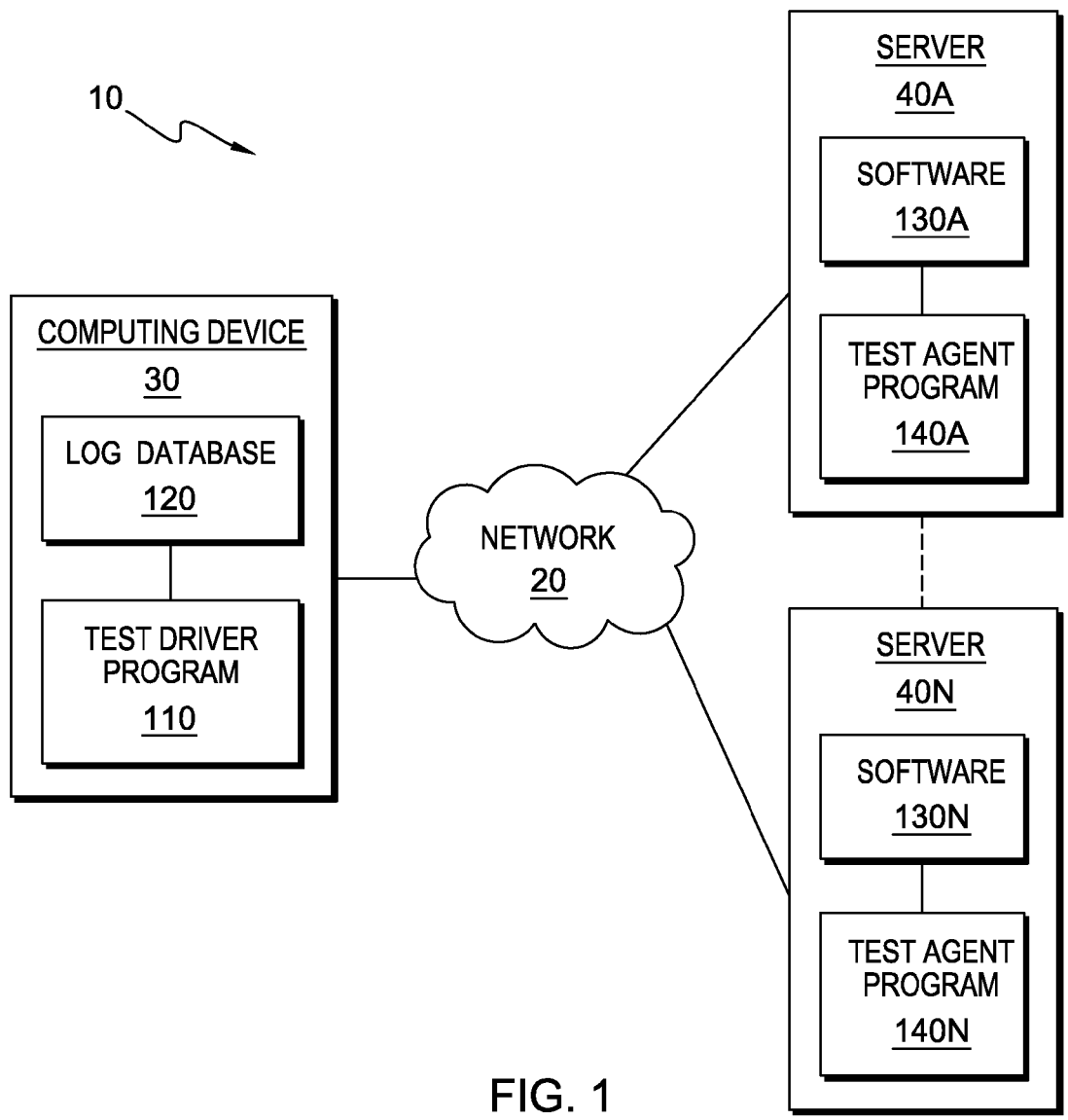
FIG. 1 depicts a diagram of a computing system, in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk®, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 depicts a diagram of computing system 10 in accordance with one embodiment of the present invention. FIG. 1 provides only an illustration of one embodiment and does not imply any limitations with regard to the environments in which different embodiments may be implemented.

In the depicted embodiment, computing system 10 includes computing device 30 and servers 40A-40N interconnected over network 20. Network 20 may be a local area network (LAN), a wide area network (WAN) such as the Internet, any combination thereof, or any combination of connections and protocols that will support communications between computing device 30 and servers 40A-40N in accordance with embodiments of the invention. Network 20 may include wired, wireless, or fiber optic connections. Computing system 10 may include additional computing devices, servers, computers, or other devices not shown.

Computing device 30 may be a management server, a web server, or any other electronic device or computing system capable of receiving and sending data. In some embodiments, computing device 30 may be a laptop computer, tablet computer, netbook computer, personal computer (PC), a desktop computer, a personal digital assistant (PDA), a smart phone, or any programmable electronic device capable of communicating with servers 40A-40N via network 20. In other embodiments, computing device 30 may represent a server computing system utilizing multiple computers as a server system, such as in a cloud computing environment. Computing device 30 contains test driver program 110 and log database 120. Computing device 30 may include components, as depicted and described in further detail with respect to FIG. 5.

Test driver program 110 operates to process received requests and send the requests to one or more applicable test agent programs of test agent programs 140A-140N. In some embodiments, test driver program 110 also operates to receive responses from one or more test agent programs of test agent programs 140A-140N and to store the responses to a database, such as log database 120. Responses received from the one or more test agent programs may indicate information about the test scenarios, such as the test services, applications, or protocols the test agent program invoked. Responses received from the one or more test agent programs may also indicate additional test agent programs, such as one or more of test agent programs 140A-140N, to which the received request was cascaded, or forwarded. In one embodiment, test driver program 110 resides on computing device 30. In other embodiments, test driver program 110 resides on another server or another computing device, provided that test driver program 110 is accessible to test agent programs 140A-140N and provided that test driver program 110 has access to log database 120 and test agent programs 140A-140N.

Log database 120 may be a repository that may be written and read by test driver program 110. In some embodiments, returned responses from test agent programs 140A-140N, are be stored to log database 120. In one embodiment, log database 120 resides on computing device 30. In other embodiments, log database 120 may reside on another server, another computing device, or one of servers 40A-40N, provided that log database 120 is accessible to test driver program 110.

Servers 40A-40N may each be management servers, web servers, or any other electronic devices or computing systems capable of receiving and sending data. In some embodiments, servers 40A-40N may each be laptop computers, tablet computers, netbook computers, personal computers (PCs), desktop computers, personal digital assistants (PDAs), smart phones, or any programmable electronic devices capable of communicating with computing device 30 and other server of servers 40A-40N via network 20. In other embodiments, servers 40A-40N may each represent a server computing system utilizing multiple computers as a server system, such as in a cloud computing environment. Servers 40A-40N each contain software 130A-130N and test agent programs 140A-140N, respectively (e.g., server 40A contains software 130A and test agent program 140A, server 40B contains software 130B and test agent program 140B). Embodiments of the present invention may include a greater or smaller number of servers 40A-40N than depicted in FIG. 1. Some embodiments of the present invention may only include a single server, such as a single server selected from servers 40A-40N. Servers 40A-40N may each include components, as depicted and described in further detail with respect to FIG. 5.

Software 130A-130N may each be generic programs, middleware, applications, or other software. Each of software 130A-130N may be located within the test environment discussed with regards to test driver program 110. In some embodiments, respective test agent programs 140A-140N are installed in the respective software of software 130A-130N. In other embodiments, respective test agent programs 140A-140N are installed to the respective server of servers 40A-40N, such that each test agent program of test agent programs 140A-140N has communicative access to the respective software of software 130A-130N. In one embodiment, each of software 130A-130N reside on servers 40A-40N, respectively. For example, software 130A resides on server 40A and software 130B resides on server 40B. In other embodiments, software 130A-130N may reside on other servers or other computing devices, provided that test agent programs 140A-140N have access to software 130A-130N, respectively.

Test agent programs 140A-140N may each operate to receive processed requests from test driver program 110, and to parse and execute associated commands within the request. In some embodiments, test agent programs 140A-140N also return responses to test driver program 110. Test agent programs 140A-140N may each also operate to discover information about the test environment, and discover other test agent programs (e.g., test agent program 140A may discover test agent program 140B) such that processed requests received from test driver program 110 may be cascaded (i.e., forwarded) to other test agent programs of test agent programs 140A-140N. Test agent programs 140A-140N may support application programming interfaces (APIs), protocols and other technologies available in the test environment and provide a discovery service capable of gathering information about the test environment, including inter-system connection details, which can be used to invoke test scenarios. An API is intended to be used as an interface by software components to communicate with each other. In one embodiment, test agent programs 140A-140N may invoke intersystem APIs to drive transactions and interactions across systems. Intersystem APIs may include APIs capable of driving transactions and interactions across multiple system environments.

Test agent programs 140A-140N may be interconnected using standard interconnection techniques appropriate to the associated application or middleware. For example, test agent programs 140A-140N may be interconnected via techniques or protocols, such as the distribution and replication protocol (DRP), hypertext transfer protocol (HTTP), simple object access protocol (SOAP), or by other techniques or protocols. In one embodiment, test agent programs 140A-140N may be functions of software 130A-130N, respectively. In one embodiment, test agent programs 140A-140N may reside, respectively, on servers 40A-40N (e.g. test agent program 140A resides on server 40A). In other embodiments, test agent programs 140A-140N may reside on other computing devices or servers, provided that test agent programs 140A-140N are accessible to test driver program 110 and other test agent programs of test agent programs 140A-140N, and provided that test agent programs 140A-140N have access to test driver program 110 and respectively have access to software 130A-130N.

Figure 2:
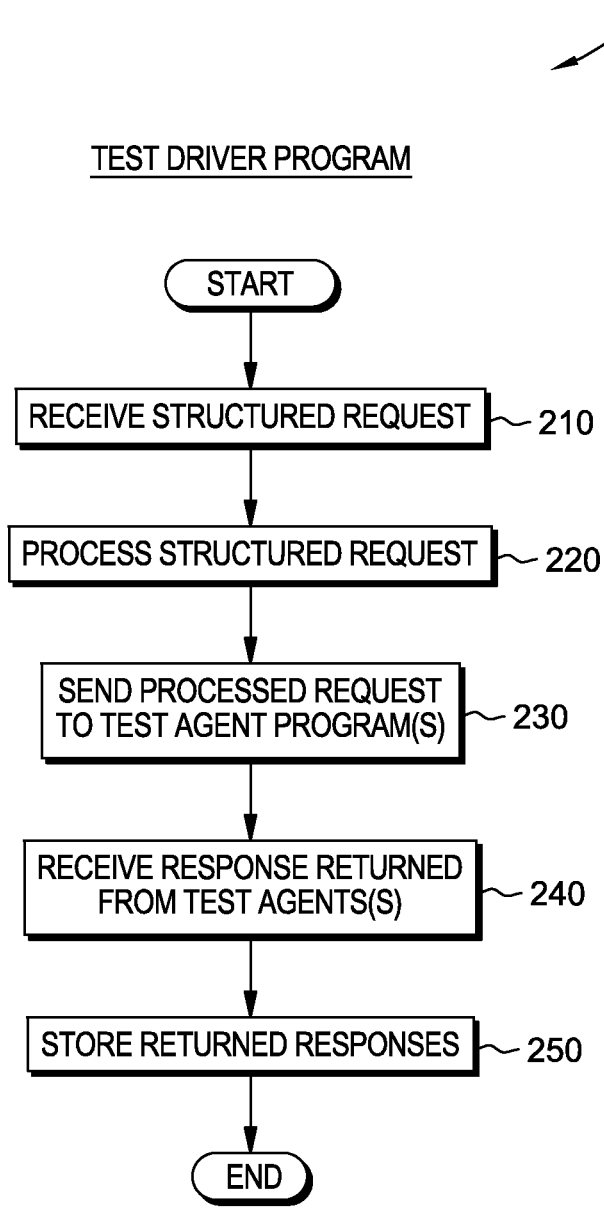
FIG. 2 depicts a flowchart of the steps of a test driver program executing within the computing system of FIG. 1, for sending processed requests to test agent programs, in accordance with one embodiment of the present invention.

FIG. 2 depicts a flowchart of the steps of test driver program 110 executing within the computing system of FIG. 1, in accordance with an embodiment of the present invention. Test driver program 110 operates to receive and process structured requests, and send the processed requests to one or more test agent program, such as test agent programs 140A-140N. In some embodiments, test driver program 110 also operates to receive returned responses from one or more test agent program, such as test agent programs 140A-140N.

In step 210, test driver program 110 receives a structured request. A structured request may be a set of structured messages representing generic or specific transaction services. Structured requests may indicate which test service, application, or protocol is to be invoked, including and required parameters, or variables to be used as input. Structured requests may contain data that includes commands, requests, and parameters for interpretation and execution by a test agent program, such as a test agent program selected from test agent programs 140A-140N. In some embodiments, the structured request is enriched with application specific data, based upon one or more of the target applications or middleware. In some embodiments, the structured request includes syntax indicating one or more test agent programs to which the structured request is directed. In other embodiments, the structured request may include syntax indicating that the request should be forwarded to additional test agent programs, as discoverable by each test agent program of test agent programs 140A-140N to which the structured request is directed. In some embodiments, test driver program 110 receives structured requests via input from a user at computing device 30. In other embodiments a repository may store a set of scheduled requests, and a program (not shown) may cause test driver program 110 to receive structured requests at times specified by the program.

In step 220, test driver program 110 processes the structured request. Processing the structured request may include using the structured request information, and any application specific data to build formatted messages. The formatted messages may be in a form capable of being received and understood by the one or more target test agent programs of target test agent programs 140A-140N, as directed by the structured request. Formatted messages may be defined such that the data in the structured request can be forwarded to additional test agent programs, of test agent programs 140A-140N for further action in accordance with the structured request.

In step 230, test driver program 110 sends the processed request to one or more test agent programs. In the depicted embodiment, each test agent program is located on a server (e.g., test agent program 140A is located on server 40A). In the depicted embodiment, test driver program 110 may send the processed request to applicable test agent programs selected from test agent programs 140A-140N via network 20 as indicated by the contents of the structured request. Upon receipt of a processed request, a test agent program of test agent programs 140A-140N may perform the steps as depicted and described with reference to in FIG. 3.

In step 240, test driver program 110 receives returned responses from applicable test agent programs, such as one or more of test agent programs 140A-140N. Responses may be returned to test driver program 110 via network 20 after processing of the request and execution of applicable actions and the creation of test scenarios by the one or more of test agent programs 140A-140N. In some embodiments, the structured request may indicate whether or not a response is required. If the structured request indicates that a response is not required, test driver program 110 may not return responses and the function would be complete. As previously discussed, responses received from the one or more test agent programs may indicate information about the test scenarios, such as the test services, applications, or protocols the test agent program invoked. Responses received from the one or more test agent programs may also indicate additional test agent programs, such as one or more of test agent programs 140A-140N, to which the received request was cascaded, or forwarded.

In step 250, test driver program 110 stores the returned responses (as applicable) from the applicable test agent program(s) of test agent programs 140A-140N. Test driver program 110 may store returned responses to a repository or database, such as log database 120 on computing device 30. In other embodiments, test driver program 110 may store returned responses to another device or location. If the structured request indicated that no response was necessary, step 250 will not occur, and the function is complete.

Figure 3:
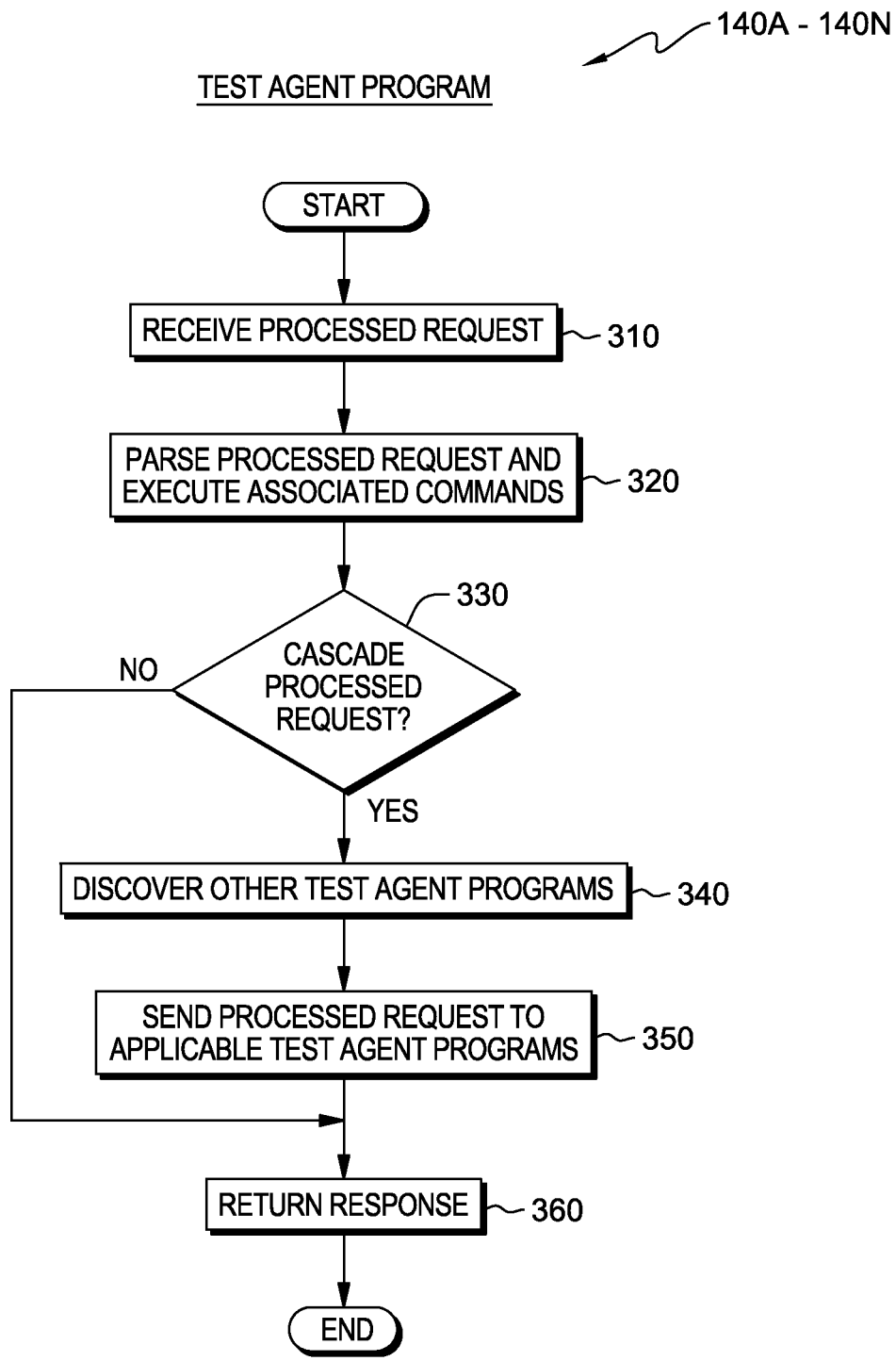
FIG. 3 depicts a flowchart of the steps of a test agent program executing within the computing system of FIG. 1, for parsing processed requests, executing associated commands, and cascading processed requests to other test agent programs, in accordance with one embodiment of the present invention.

FIG. 3 depicts a flowchart of the steps of a test agent program (hereinafter referred to as test agent program 140), such as one of test agent programs 140A-140N, executing within the computing system of FIG. 1, in accordance with an embodiment of the present invention. Test agent program 140 operates to receive processed requests and execute any associated commands. Test agent program 140 may also return a response to the request to test driver program 110. Test agent program 140 may also operate to forward or cascade received processed requests to one or more other test agent programs of test agent programs 140A-140N based on information received in the received processed request.

In one embodiment, initially, a structured request has been processed by test driver program 110 and sent to test agent program 140 via network 20.

In step 310, test agent program 140 receives the processed request. Test agent program 140 may receive processed requests from test driver program 110 via network 20. The processed request may represent a generic or specific transaction service. The processed request may indicate to test agent program 140 which test service, application, or protocol is to be invoked by test agent program 140, and the processed request may indicate any required parameters. Some processed requests may include additional requests that may require additional application specific data which can be included with the processed request generated by test driver program 110. Additional requests may include services such as web services, message queuing services, database services, local services, or other service requests. In some embodiments, prior to receiving the processed request, test agent program 140 may be in a passive state, listening for processed requests, and test agent program 140 will only activate upon receiving a processed request.

In step 320, test agent program 140 parses the processed request and executes any associated commands within the processed request. The processed request may indicate which test services, applications, programs, APIs or protocols to invoke. Parsing the processed request may include reading and interpreting the request. For example, a processed request may name a program and provide parameters for the program's invocation. Test agent program 140 may parse the data, and then invoke the program with the supplied parameters. In addition, the processed request may indicate that the request, or data, should be forwarded or cascaded to one or more additional test agent programs 140A-140N.

Based on the information in the request, test agent program 140 may invoke one or more test services, applications, or protocols. Test agent program 140 may utilize available APIs, protocols, applications, and/or programs as directed by the processed request to invoke behaviors capable of being monitored by transaction tracking software. Transaction tracking software may be installed into the same test environments as test agent program 140 and test agent programs 140A-140N. Transaction tracking software may monitor the behaviors and transactions initiated by test agent program 140. Some processed requests may indicate one or more specific test agent programs of test agent programs 140A-140N to cascade the processed request, while other processed requests may indicate that test agent program 140 should provide discovery services. Discovery services may include gathering information about the test environment within with test agent program 140 resides. Discovery services may additionally include providing inter-system connection details and other test agent programs of test agent programs 140A-140N that are communicatively accessible to test agent program 140.

In decision 330, test agent program 140 will determine whether to cascade the processed request to one or more of test agent programs 140A-140N. Test agent program 140 may determine to cascade the processed request to one or more of test agent programs 140A-140N if the processed request indicates that one or more specific test agent programs of test agent programs 140A-140N receive the processed request. Alternatively, test agent program 140 may determine to cascade the processed request to one or more of test agent programs 140A-140N if the processed request indicates that the request should be cascaded to all discoverable test agent programs 140A-140N, or to test agent programs 140A-140N associated with particular middleware, applications or systems.

If test agent program 140 determines not to cascade the processed request (decision 330, no branch), test agent program 140 will return the responses of the execution of commands associated with the received processed request to test driver program 110 (step 360) for storage, as discussed with reference to FIG. 2. Test agent program 140 may determine not to cascade the processed request if the processed request does not indicate that the request should be cascaded to any specific or discoverable test agent programs of test agent programs 140A-140N. Alternatively, test agent program 140 may determine not to cascade the processed request if test agent program 140 determines that there are no discoverable test agent programs 140A-140N communicatively accessible to test agent program 140. Once all responses are returned to test driver program 110, the function is complete.

If test agent program 140 determines to cascade processed requests (decision 330, yes branch), test agent program 140 may utilize discovery services to discover other test agent programs, such as test agent programs 140A-140N communicatively accessible to test agent program 140 (step 340). In some embodiments, the processed request may indicate specific test agent programs of test agent programs 140A-140N to which the processed request should be forwarded to, and that discovery is not necessary, which may result in a bypass of step 340. Test agent program 140 may discover other test agent programs, such as test agent programs 140A-140N by gathering information about the test environment, including inter-system connection details. Test agent program 140 may support the APIs, protocols, and other technologies available in the test environment and utilize these tools to discover other test agent programs, such as test agent programs 140A-140N. For example, in some systems, connected systems can be queried by an API. In such a system, test agent program 140 could issue a call to the system to retrieve a list of connected systems, and then test agent program 140 could use the list of connected systems to invoke additional test agent programs, such as one or more of test agent programs 140A-140N, on connected systems.

In step 350, test agent program 140 sends the processed request to applicable test agent programs, such as test agent programs 140A-140N. Applicable test agent programs may include test agent programs discovered by test agent program 140 via the discovery services described above. Applicable test agent programs may also include test agent programs specified in the received processed request. Upon receipt of the processed request, each test agent program of test agent programs 140A-140N will perform similar steps to parse and execute commands associated with the request, and potentially further cascade the request to additional test agent programs. In some embodiments, parameters in the request may indicate that multiple related requests should be executed together across multiple test agent programs 140A-140N as a set.

In step 360, test agent program 140 returns the responses of the execution of commands associated with the received processed request to test driver program 110 for storage, as discussed with reference to FIG. 2. Responses generated by test agent programs 140A-140N may indicate information about the test scenarios, such as the test services, applications, or protocols the test agent program invoked. Responses may also indicate additional test agent programs, to which test agent program 140 forwarded the request. Once the responses are returned to test driver program 110, the function is complete. In some embodiments, the processed request may indicate that returning a response is unnecessary, and the function may be complete after executing and cascading the processed request.

Figure 4:
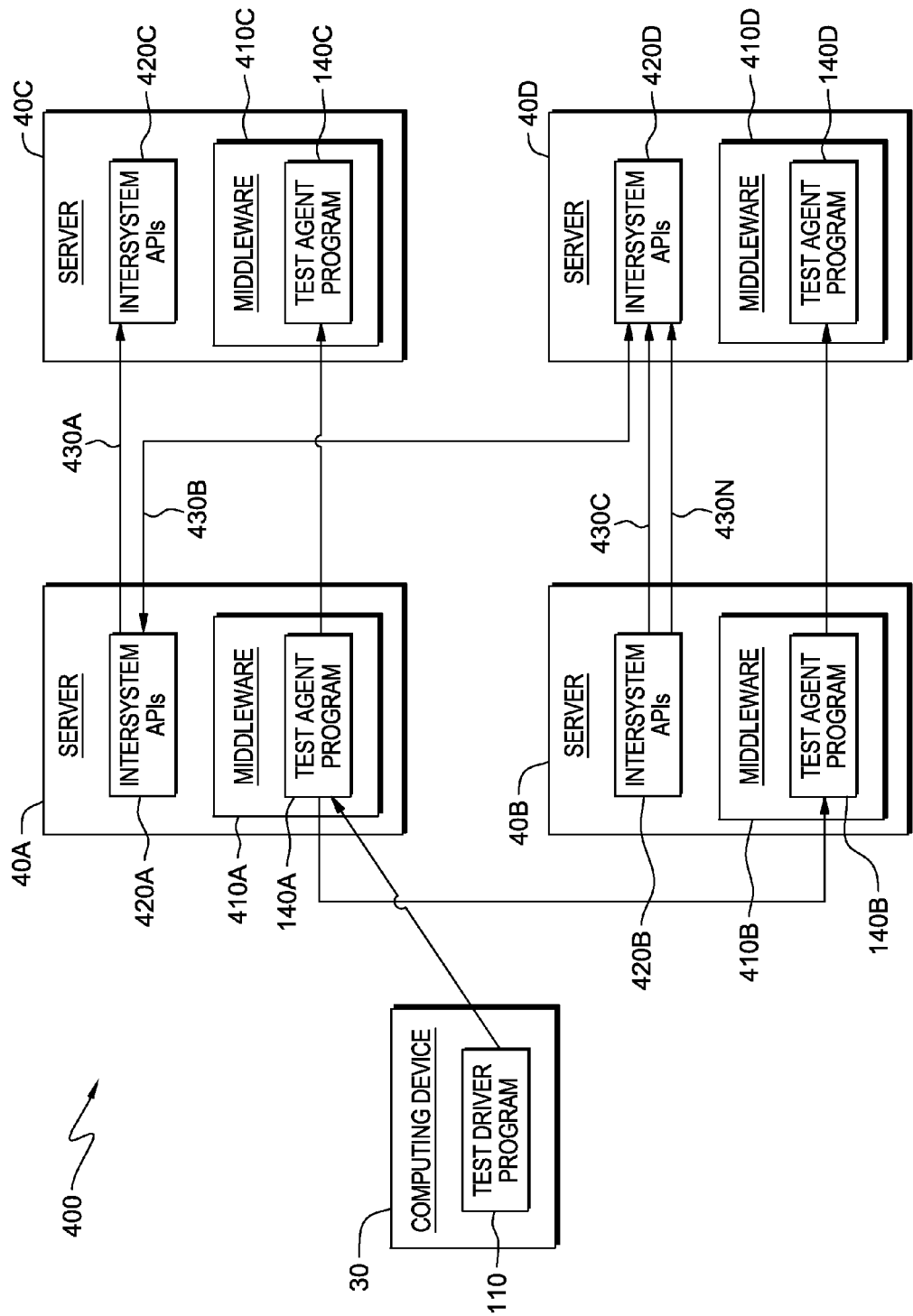
FIG. 4 depicts a use-case scenario in accordance with one embodiment of the present invention.

FIG. 4 depicts use-case scenario 400 of computing system 10, in accordance with one embodiment of the present invention. Use-case scenario 400 depicts computing device 30 interconnected with server 40A. Use-case scenario 400 also depicts servers 40A-40D interconnected with one another. In use-case scenario 400, network 20 (see FIG. 1) has been removed to enhance clarity when discussing communications between computing device 30, and servers 40A-40D.

Use-case scenario 400 depicts test driver program 110 sending a request to test agent program 140A instructing test agent program 140A to invoke intersystem APIs 420A, such that intersystem APIs 420A generates transactions and interactions, such as intersystem interactions 430A-430N. In some embodiments, test agent program 140A may utilize discovery services to discover intersystem APIs, such as intersystem APIs 420A, located within the environment. In addition, the request may indicate that the receiving test agent program, such as test agent program 140A, invoke discovery services to cascade the request to additional test agent programs, such as test agent programs 140B-140D, or additional discoverable test agent programs (not shown).

In scenario 400, test agent programs 140A-140N are capable of driving intersystem APIs, such as intersystem APIs 420A-420D, from within middleware 410A-410D, respectively. As depicted by scenario 400, after receiving the request sent by test driver program 110, test agent program 140A invokes intersystem APIs 420A to generate intersystem interactions 430A and 430B. Intersystem interactions 430A and 430B may include transactions or interactions that occur across systems capable of being monitored by transaction tracking technologies.

In scenario 400, test agent program 140A also cascades the request to discovered test agent programs 140B and 140C. Based on the request, this may cause test agent programs 140B and 140C to also invoke intersystem APIs 140B and 140C, respectively. For example, in scenario 400, test agent program 140B invokes intersystem APIs 420B to generate intersystem interactions 430C and 430N.

Use-case scenario 400 is merely one depicted example of the present invention. Additional components, software, test driver programs, test agent programs, and interactions may be included in other embodiments. Intersystem interactions 430A-430N may include any number of interactions and transactions, and the nature of the interaction may depend upon available APIs, protocols, and/or additional factors.

Figure 5:
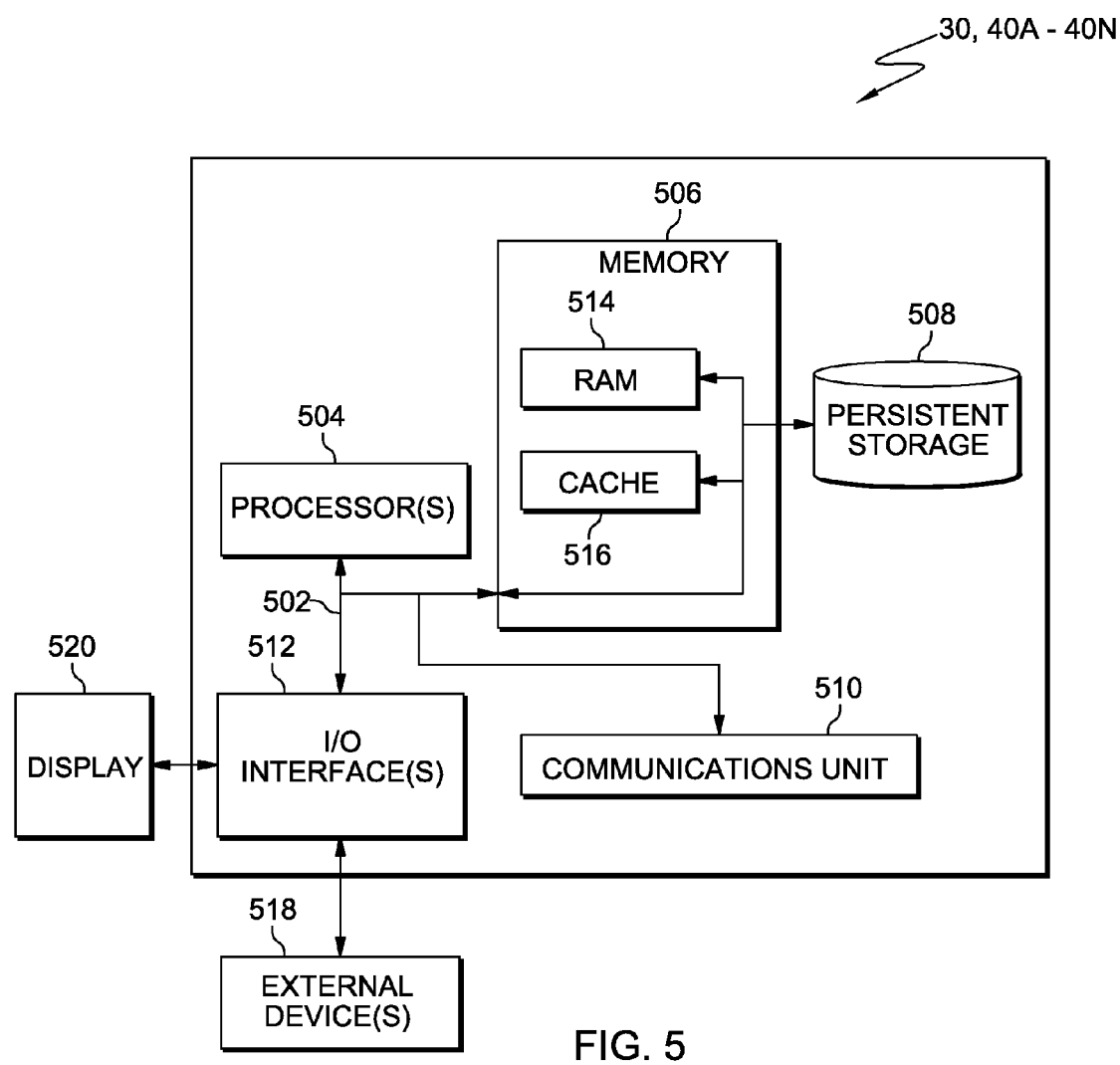
FIG. 5 depicts a block diagram of components of the computing device and servers, in accordance with one embodiment of the present invention.

FIG. 5 depicts a block diagram of components of computing device 30 and servers 40A-40N, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 30 and servers 40A-40N each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Test driver program 110 and log database 120 are stored in persistent storage 508 of computing device 30 for execution and/or access by one or more of the respective computer processors 504 of computing device 30 via one or more memories of memory 506 of computing device 30. Software 130A-130N and test agent programs 140A-140N are stored, respectively, in persistent storage 508 of servers 40A-40N for execution and/or access by one or more of the respective computer processors 504 of servers 40A-40N via one or more memories of memory 506 of servers 40A-40N. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Test driver program 110 may be downloaded to persistent storage 508 of computing device 30 through communications unit 510 of computing device 30. Software 130A-130N and test agent programs 140A-140N may be downloaded, respectively, to persistent storage 508 of servers 40A-40N through communications unit 510 of servers 40A-40N.

I/O interface(s) 512 allows for input and output of data with other devices that may be connected to computing device 30 and servers 40A-40N. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., test driver program 110 and log database 120, can be stored on such portable computer-readable storage media and can be loaded onto persistent storage 508 of computing device 30 via I/O interface(s) 512 of computing device 30. Software and data used to practice embodiments of the present invention, e.g., software 130A-130N and test agent programs 140A-140N, can be each stored respectively on such portable computer-readable storage media and can be loaded, respectively, onto persistent storage 508 of servers 40A-40N via I/O interface(s) 512 of servers 40A-40N. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating test transactions across computing systems, the method comprising:
   a first test function of a first program on a first computing system of a test environment for transaction tracking software receiving a plurality of instructions, wherein:
   the plurality of instructions includes at least a first instruction and a second instruction;
   the first instruction is to at least invoke a first transaction between an alternate function of the first program and a second program on a second computing system of the test environment for the transaction tracking software; and
   the second instruction is to send the plurality of instructions to at least a second test function on a third computing system of the test environment for the transaction tracking software and to cascade the plurality of instructions to each test function discovered on one or more other computing systems;
   the first test function of the first program causing the first transaction between the alternate function of the first program on the first computing system and the second program on the second computing system by invoking an application programming interface (API) of the alternate function, wherein the API initiates the transaction between the alternate function of the first program on the first computing system and the second program on the second computing system, based on the first instruction, wherein the first transaction is a test transaction monitored by the transaction tracking software; and
   the first test function of the first program sending the plurality of instructions to the second test function on the third computing system, based on the second instruction.

2. The method of claim 1, further comprising:
   the first test function of the first program discovering at least the second test function on the third computing system.

3. The method of claim 2, wherein the step of the first test function of the first program discovering at least the second test function on the third computing system comprises:
   the first test function of the first program issuing an API call for a list of connected computing systems; and
   the first test function of the first program using the list of connected computing systems of the plurality of computing systems to locate the second test function on the third computing system.

4. The method of claim 1, wherein the first program is middleware.

5. The method of claim 1, further comprising:
   the first test function of the first program returning information about the first transaction and an indication that the plurality of instructions were sent to the second test function on the third computing system.

* * * * *